United States Patent
Kadoya et al.

(10) Patent No.: US 12,306,096 B2
(45) Date of Patent: May 20, 2025

(54) METHOD FOR SELECTING POLYESTER FILM, METHOD FOR PRODUCING MULTILAYER BODY, METHOD FOR PRODUCING PACKAGE, AND MULTILAYER BODY

(71) Applicant: TOPPAN INC., Tokyo (JP)

(72) Inventors: Haruna Kadoya, Tokyo (JP); Shigeki Kudo, Tokyo (JP); Kenji Ogawara, Tokyo (JP)

(73) Assignee: TOPPAN INC., Tokyo (JP)

( * ) Notice: Subject to any disclaimer, the term of this patent is extended or adjusted under 35 U.S.C. 154(b) by 648 days.

(21) Appl. No.: 17/614,123

(22) PCT Filed: May 14, 2020

(86) PCT No.: PCT/JP2020/019212
§ 371 (c)(1),
(2) Date: Nov. 24, 2021

(87) PCT Pub. No.: WO2020/241272
PCT Pub. Date: Dec. 3, 2020

(65) Prior Publication Data
US 2022/0228978 A1    Jul. 21, 2022

(30) Foreign Application Priority Data

May 29, 2019  (JP) .................................. 2019-100322
Dec. 18, 2019  (JP) .................................. 2019-228193

(51) Int. Cl.
*G01N 21/3563*    (2014.01)
*B32B 7/02*    (2019.01)
(Continued)

(52) U.S. Cl.
CPC ......... *G01N 21/3563* (2013.01); *B32B 27/36* (2013.01); *B65B 51/10* (2013.01);
(Continued)

(58) Field of Classification Search
None
See application file for complete search history.

(56) References Cited

U.S. PATENT DOCUMENTS

| | | | | |
|---|---|---|---|---|
| 4,375,494 | A | * | 3/1983 | Stokes .................... B32B 27/08 428/323 |
| 2009/0011263 | A1 | * | 1/2009 | Forloni ................... B32B 7/027 428/483 |

(Continued)

FOREIGN PATENT DOCUMENTS

| | | |
|---|---|---|
| CN | 106280306 A | 1/2017 |
| JP | S55-166248 | 12/1980 |

(Continued)

OTHER PUBLICATIONS

JP 2017-178357 A (Hongo et al.) (published Oct. 5, 2017) (machine translation). (Year: 2017).*

(Continued)

*Primary Examiner* — Vivian Chen
(74) *Attorney, Agent, or Firm* — STAAS & HALSEY LLP

(57) ABSTRACT

The present disclosure relates to a method for selecting a polyester film in which the polyester film is used as a sealant layer in a multilayer body including a base material layer including a crystalline polyester film, an adhesive layer and a sealant layer in this order, the method including:
a step in which FT-IR analysis is performed on the polyester film by a reflection method, and the crystallinity of the polyester film is measured by the following formula; and
a step in which a first polyester film having a crystallinity of 2 to 15% is selected:

$I_{1409} = p1 \times I_{1340} + p2 \times I_{1370}$    (Formula 1)

Crystallinity [%] = $p1 \times (I_{1340}/I_{1409}) \times 100$    (Formula 2).

10 Claims, 2 Drawing Sheets

(51) Int. Cl.

| | |
|---|---|
| *B32B 7/12* | (2006.01) |
| *B32B 15/09* | (2006.01) |
| *B32B 15/20* | (2006.01) |
| *B32B 27/08* | (2006.01) |
| *B32B 27/36* | (2006.01) |
| *B32B 37/12* | (2006.01) |
| *B32B 37/14* | (2006.01) |
| *B65B 51/10* | (2006.01) |
| *B65D 65/40* | (2006.01) |
| *C08J 7/00* | (2006.01) |
| *G01N 21/35* | (2014.01) |
| *G01N 21/84* | (2006.01) |

(52) U.S. Cl.
CPC .............. *B65D 65/40* (2013.01); *C08J 7/00* (2013.01); *B32B 7/02* (2013.01); *B32B 7/12* (2013.01); *B32B 15/09* (2013.01); *B32B 15/20* (2013.01); *B32B 27/08* (2013.01); *B32B 37/12* (2013.01); *B32B 37/14* (2013.01); *B32B 2250/03* (2013.01); *B32B 2250/24* (2013.01); *B32B 2250/244* (2013.01); *B32B 2255/10* (2013.01); *B32B 2255/20* (2013.01); *B32B 2272/00* (2013.01); *B32B 2305/70* (2013.01); *B32B 2307/31* (2013.01); *B32B 2307/702* (2013.01); *B32B 2307/704* (2013.01); *B32B 2307/7244* (2013.01); *B32B 2307/7246* (2013.01); *B32B 2439/02* (2013.01); *B32B 2439/40* (2013.01); *B32B 2439/46* (2013.01); *B32B 2439/70* (2013.01); *B32B 2439/80* (2013.01); *C08J 2367/00* (2013.01); *G01N 2021/3595* (2013.01); *G01N 21/8422* (2013.01); *Y10T 428/2817* (2015.01); *Y10T 428/31786* (2015.04)

(56) References Cited

U.S. PATENT DOCUMENTS

| | | | |
|---|---|---|---|
| 2011/0081543 A1 | 4/2011 | Lee et al. | |
| 2018/0186948 A1* | 7/2018 | Yajima | B32B 27/36 |
| 2022/0314589 A1* | 10/2022 | Kudo | B32B 27/36 |

FOREIGN PATENT DOCUMENTS

| | | | |
|---|---|---|---|
| JP | H4-011635 A | | 1/1992 |
| JP | H4-025455 A | | 1/1992 |
| JP | 8-118537 A | | 5/1996 |
| JP | 2006-305975 A | * | 11/2006 |
| JP | 2017-178357 A | | 10/2017 |
| JP | 2018-034425 A | * | 3/2018 |

OTHER PUBLICATIONS

JP 04-025455 A (Hirotaka et al.) (published Jan. 29, 1992) (Google Patents machine translation). (Year: 1992).*
CN 106280306 A (Li) (published Jan. 4, 2017) (machine translation). (Year: 2017).*
JP 08-118537 A (Kazuhiro) (published May 14, 1996) (machine translation). (Year: 1996).*
Vasanthan, N. and Salem, D.R. Infrared spectroscopic characterization of oriented polyamide 66: Band assignment and crystallinity measurement. J. Polym. Sci. B Polym. Phys., 38: 516-524 (2000). (Year: 2000).*
Kimura, F., Kimura, T., Sugisaki, A., Komatsu, M., Sata, H. and Ito, E. FTIR spectroscopic study on crystallization process of poly(ethylene-2,6-naphthalate). J. Polym. Sci. B Polym. Phys., 35: 2741-2747 (1997). (Year: 1997).*
International Preliminary Report on Patentability (Forms PCT/IB/338; PCT/IB/373); mailed Dec. 9, 2021 in corresponding PCT Application No. PCT/JP2020/019212 ( 2 pages).
Written Opinion (Form PCT/ISA/237); mailed Jul. 28, 2020 in corresponding PCT Application No. PCT/JP2020/019212 (7 pages); (8 pages English Translation).
Indonesian Office Action issued in counterpart Indonesian Application No. P00202111779 dated Jun. 19, 2023.
Extended European Search Report dated Dec. 2, 2022 in counterpart European Patent Application No. 20813065.8 (7 pages).
International Search Report (Form PCT/ISA/210); mailed Jul. 28, 2020 in corresponding PCT Application No. PCT/JP2020/019212 (4 pages) (4 pages English Translation).
Written Opinion (Form PCT/ISA/237); mailed Jul. 28, 2020 in corresponding PCT Application No. PCT/JP2020/019212 (7 pages).

* cited by examiner

Fig.1

Fig.2

METHOD FOR SELECTING POLYESTER FILM, METHOD FOR PRODUCING MULTILAYER BODY, METHOD FOR PRODUCING PACKAGE, AND MULTILAYER BODY

CROSS REFERENCE TO RELATED APPLICATIONS

This application is a U.S. National Stage Application under 35 U.S.C. § 371 of PCT International Patent Application No. PCT/JP2020/019212, filed on May 14, 2020, which claims the foreign priority benefit under 35 U.S.C. § 119 of Japanese Patent Application Nos. 2019-100322, filed on May 29, 2019, and 2019-228193, filed on Dec. 18, 2019 in the Japanese Patent Office, the contents of which the International Patent Application and the Japanese Applications are incorporated by reference herein in their entirety.

TECHNICAL FIELD

The present disclosure relates to a method for selecting a polyester film, a method for producing a multilayer body, a method for producing a package, and a multilayer body.

BACKGROUND ART

A multilayer body (soft packaging material) including a biaxially stretched polyethylene terephthalate (PET) film having excellent heat resistance and toughness as a base film and a polyolefin film such as polyethylene or polypropylene as a sealant layer is known (for example, Patent Literature 1).

CITATION LIST

Patent Literature

[Patent Literature 1] Japanese Unexamined Patent Publication No. 2017-178357

SUMMARY OF INVENTION

Technical Problem

Incidentally, in recent years, due to the increasing environmental awareness caused by the problem of marine plastic waste and the like, there has been an increasing demand for higher efficiency in separate collection and recycling of plastic materials. That is, in the related art, even in the case of soft packaging materials, which have been improved in performance by combining various different materials, there is a demand for monomaterialization.

In a multilayer body using a PET film as a base film, it is necessary to use a polyester film for a sealant layer in order to realize monomaterialization. However, when a polyester film is used as a sealant layer, there is a risk of filling suitability and the strength of a packaging material being insufficient.

The present disclosure has been made in view of the above circumstances, and an object of the present disclosure is to provide a method for selecting a polyester film used as a sealant layer, by which a multilayer body that can achieve both excellent filling suitability and strength of a packaging material can be obtained even when a polyester film is mainly used. Another object of the present disclosure is to provide a method for producing a multilayer body using the polyester film selected based on the selection method, a method for producing a package using the multilayer body produced by the production method, and a multilayer body.

Solution to Problem

One aspect of the present disclosure provides a method for selecting a polyester film in which the polyester film is used as a sealant layer in a multilayer body including a base material layer including a crystalline polyester film, an adhesive layer and a sealant layer in this order, the method including: performing FT-IR analysis on reference polyester films by a reflection method, and measuring the crystallinity of a polyester film of interest by the following general formula as is disclosed in greater detail below; and a step in which a first polyester film having a crystallinity of 2 to 15% is selected:

$$I_{1409} = p1 \times I_{1340} + p2 \times 1_{1370} \quad \text{(Formula 1)}$$

$$\text{Crystallinity } [\%] = p1 \times (I_{1340}/I_{1409}) \times 100 \quad \text{(Formula 2)}$$

(in the formula, $I_{1409}$ indicates an absorbance at a wavenumber of 1,409 cm$^{-1}$, $I_{1370}$ indicates an absorbance at a wavenumber of 1,370 cm$^{-1}$, and $I_{1340}$ indicates an absorbance at a wavenumber of 1,340 cm$^{-1}$; here, 1,409 cm$^{-1}$: normalization band, 1,370 cm$^{-1}$: cis-conformer band (derived from an amorphous phase), 1,340 cm$^{-1}$: trans-conformer band (trans-conformer absorption band: derived from a crystal phase)).

The selection method of the present disclosure may further include a step in which a second polyester film having a crystallinity of 10% or more is selected.

One aspect of the present disclosure provides a method for producing a multilayer body including a step in which a base material layer including a crystalline polyester film and a sealant layer are laminated with an adhesive layer therebetween, wherein the first polyester film selected by the selection method is used as the sealant layer.

One aspect of the present disclosure provides a method for producing a multilayer body including a step in which a base material layer including a crystalline polyester film and a sealant layer are laminated with an adhesive layer therebetween, wherein the first polyester film and the second polyester film selected by the selection method are used as the sealant layer.

In the method for producing a multilayer body of the present disclosure, the thickness of the sealant layer may be 15 μm or more.

In the method for producing a multilayer body of the present disclosure, the crystalline polyester film may include an inorganic oxide vapor deposition layer on at least one surface.

In the method for producing a multilayer body of the present disclosure, the water vapor transmissivity of the multilayer body may be 10 g/m²·day or less.

In the method for producing a multilayer body of the present disclosure, the oxygen transmissivity of the multilayer body may be 5 cc/m²·day or less.

One aspect of the present disclosure provides a method for producing a package including a step in which heat-sealing is performed when the sealant layers of the multilayer body produced by the production method are made to face each other and a package with the filled content is obtained.

In the method for producing a package of the present disclosure, the volume proportion of air in the package at 23° C. may be 15 vol % or less.

One aspect of the present disclosure provides a multilayer body including a base material layer including a crystalline polyester film, an adhesive layer and a sealant layer in this order, wherein the sealant layer includes a first polyethylene terephthalate film, and wherein, when FT-IR analysis is performed by a reflection method, the crystallinity of the first polyethylene terephthalate film obtained by the following general formula, as is disclosed in greater detail below, is 2 to 15%:

$$I_{1409} = p1 \times I_{1340} + p2 \times 1_{1370} \quad \text{(Formula 1)}$$

$$\text{Crystallinity}[\%] = p1 \times (I_{1340}/I_{1409}) \times 100 \quad \text{(Formula 2)}$$

(in the formula, $I_{1409}$ indicates an absorbance at a wavenumber of 1,409 cm$^{-1}$, $I_{1370}$ indicates an absorbance at a wavenumber of 1,370 cm$^{-1}$, and $I_{1340}$ indicates an absorbance at a wavenumber of 1,340 cm$^{-1}$).

In the multilayer body of the present disclosure, the sealant layer may further include a second polyester film on the side of the adhesive layer with respect to the first polyester film. In this case, the crystallinity of the second polyester film may be 10% or more.

In the multilayer body of the present disclosure, the thickness of the sealant layer may be 15 μm or more.

In the multilayer body of the present disclosure, the ratio of the thickness of the first polyester film to the thickness of the sealant layer may be 10 to 70%.

In the multilayer body of the present disclosure, the crystalline polyester film may include an inorganic oxide vapor deposition layer on at least one surface.

The multilayer body of the present disclosure may further include a metal layer between the base material layer and the adhesive layer.

The water vapor transmissivity of the multilayer body of the present disclosure may be 10 g/m²·day or less.

The oxygen transmissivity of the multilayer body of the present disclosure may be 5 cc/m²·day or less.

In the multilayer body of the present disclosure, the total mass of components other than a polyester component with respect to the total mass of the multilayer body may be 10 mass % or less.

Advantageous Effects of Invention

According to the present disclosure, it is possible to provide a method for selecting a polyester film used as a sealant layer, by which a multilayer body that can achieve both excellent filling suitability and strength of a packaging material can be obtained even when a polyester film is mainly used. In addition, according to the present disclosure, it is possible to provide a method for producing a multilayer body using the polyester film selected based on the selection method, a method for producing a package using the multilayer body produced by the production method, and a multilayer body.

DESCRIPTION OF EMBODIMENTS

Hereinafter, embodiments of the present disclosure will be described in detail. However, the present disclosure is not limited to the following embodiments.

<Multilayer Body>

Figure 1:
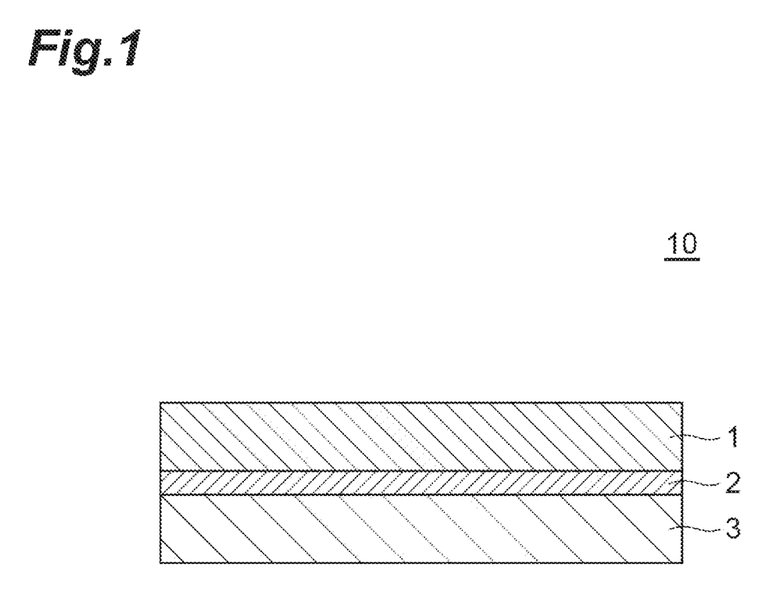
FIG. 1 is a schematic cross-sectional view of a multilayer body according to one embodiment.

FIG. 1 is a schematic cross-sectional view of a multilayer body according to one embodiment. A multilayer body 10 according to one embodiment includes a base material layer 1, an adhesive layer 2 and a sealant layer 3 in this order.

Figure 2:
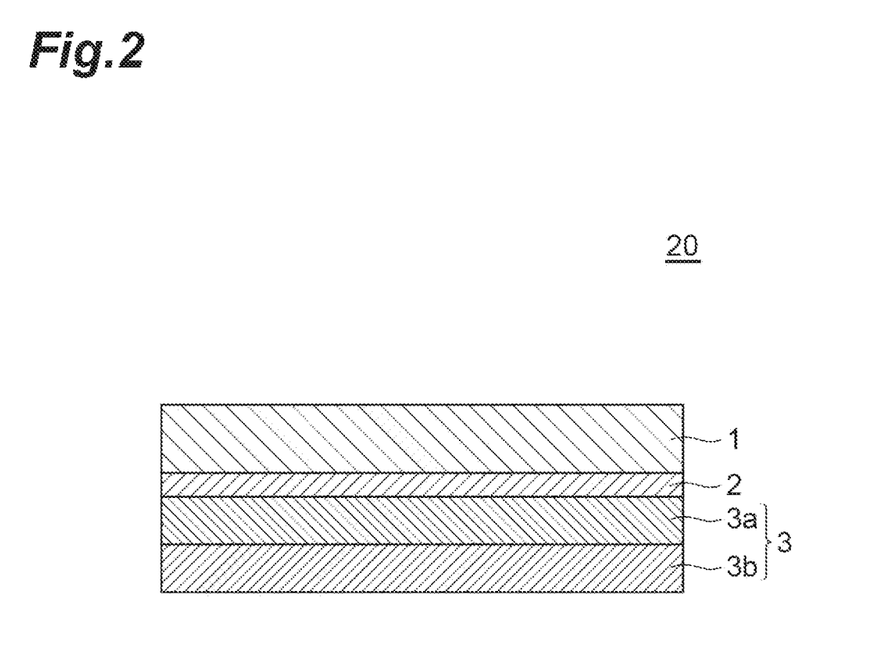
FIG. 2 is a schematic cross-sectional view of a multilayer body according to another embodiment.

FIG. 2 shows a schematic cross-sectional view of a multilayer body according to another embodiment. A multilayer body 20 according to another embodiment includes a base material layer 1, an adhesive layer 2, and a sealant layer 3 including a sealant base material layer 3a and a heat seal layer 3b in this order.

[Base Material Layer]

The base material layer is a support film (base film) and includes a crystalline polyester film. The base material layer may be formed of a crystalline polyester film. The crystalline polyester film may be a stretched film or a non-stretched film. The crystallinity of the crystalline polyester film may be 40% or more. The melting point of the crystalline polyester film can be 250° C. or higher and may be 255° C. or higher.

The crystalline polyester can be obtained by, for example, condensation polymerization of diols and dicarboxylic acids.

Examples of diols include aliphatic diols and alicyclic diols, and for example, compounds such as ethylene glycol, diethylene glycol, triethylene glycol, 1,2-propylene glycol, 1,3-propylene glycol, dipropylene glycol, trimethylene glycol, tetramethylene glycol, pentamethylene glycol, hexamethylene glycol, octamethylene glycol, nonamethylene glycol, decamethylene glycol, neopentyl glycol, 1,4-butanediol, and 1,4-cyclohexanedimethanol may be exemplified. These compounds may be used alone or two or more thereof may be used in combination. In addition, ethylene glycol derived from biomass may be used.

Examples of dicarboxylic acids include aliphatic dicarboxylic acids, alicyclic dicarboxylic acids, and aromatic dicarboxylic acids, and for example, compounds such as oxalic acid, malonic acid, succinic acid, glutaric acid, adipic acid, pimelic acid, suberic acid, glutaconic acid, azelaic acid, sebacic acid, nonadicarboxylic acid, decanedicarboxylic acid, undecanedicarboxylic acid, dodecanedicarboxylic acid, maleic acid, fumaric acid, mesaconic acid, citraconic acid, itaconic acid, isophthalic acid, terephthalic acid, n-dodecyl succinic acid, n-dodecenyl succinic acid, cyclohexanedicarboxylic acid, and anhydrides or lower alkyl esters of these acids may be exemplified. These compounds may be used alone or two or more thereof may be used in combination.

In order for the packaging material to exhibit functions sufficiently, polybutylene terephthalate, polybutylene naphthalate, polyethylene terephthalate or the like can be used as the crystalline polyester for the base material layer.

The base material layer may contain a recycled polyester. Examples of recycled polyesters include a chemically recycled polyester obtained by chemically recycling containers made of polyesters mainly composed of ethylene terephthalate units and a mechanically recycled polyester obtained by mechanically recycling containers made of polyesters mainly composed of ethylene terephthalate units.

For example, the base material layer may include an inorganic oxide vapor deposition layer on at least one surface in order to improve gas barrier properties with respect to water vapor and oxygen. When an inorganic oxide vapor deposition layer is used, strong barrier properties can be obtained with a very thin layer that does not affect recyclability of the multilayer body. Examples of inorganic oxides include aluminum oxide, silicon oxide, magnesium oxide, and tin oxide. In consideration of transparency and barrier properties, the inorganic oxide may be selected from the group consisting of aluminum oxide, silicon oxide, and magnesium oxide. The thickness of the inorganic oxide vapor deposition layer can be, for example, 5 nm or more and 100 nm or less, and may be 10 nm or more and 50 nm or less. When the thickness is 5 nm or more, barrier properties are favorably easily exhibited, and when the thickness is 100 nm or less, the flexibility of the multilayer body is easily maintained. The vapor deposition layer can be formed by, for example, a physical vapor growth method, a chemical vapor growth method, or the like.

The base material layer may include a plurality of crystalline polyester film layers, and in this case, the crystalline polyester films may be the same as or different from each other. When the base material layer includes a plurality of crystalline polyester film layers, at least one crystalline polyester film layer may include an inorganic oxide vapor deposition layer on the surface thereof.

The thickness of the base material layer can be, for example, 5 jam to 1 mm or less, and may be 5 to 800 µm, or 5 to 500 µm. When the base material layer includes a plurality of crystalline polyester film layers, the total thickness thereof may be within the above range.

Here, the multilayer body may further include a metal layer (metal foil) in place of or in addition to the vapor deposition layer of the inorganic oxide. That is, the multilayer body may further include a metal layer between the base material layer and the adhesive layer.

For the metal layer, various metal foils made of aluminum, stainless steel or the like can be used, and among these, an aluminum foil is preferable in consideration of moisture resistance, processability such as spreadability, cost and the like. A general soft aluminum foil can be used as the aluminum foil. Among these, an aluminum foil containing iron is preferable because it has excellent pinhole resistance and spreadability during molding.

When the metal layer is provided, the thickness thereof may be 7 to 50 µm or 9 to 15 µm in consideration of barrier properties, pinhole resistance, processability, and the like.

[Adhesive Layer]

As an adhesive component of the adhesive layer, for example, a 2-component curable polyurethane adhesive that allows a bifunctional or higher aromatic or aliphatic isocyanate compound as a curing agent to act on a main agent such as a polyester polyol, polyether polyol, or acrylic polyol may be exemplified.

The adhesive layer can be formed by applying an adhesive component to a base material layer and then drying it. When a polyurethane adhesive is used, after application, for example, aging is performed at 40° C. for 4 days or longer, and thus the reaction between hydroxy groups of the main agent and isocyanate groups of the curing agent proceeds and strong adhesion becomes possible.

In consideration of the adhesiveness, followability, processability, and the like, the thickness of the adhesive layer may be 2 to 50 µm, and may be 3 to 20 µm.

[Sealant Layer]

The sealant layer is a layer that imparts sealability by heat-sealing in the multilayer body, and includes a single polyester film or a plurality of polyester films as described above. The sealant layer may be formed of a polyester film. The polyester film constituting the sealant layer can also be called a polyester layer (polyester resin layer) or the like.

FT-IR analysis is performed by the reflection method, and the crystallinity of the first polyester film obtained by the following general formula, as is disclosed in greater detail below, is 2 to 15%.

$$I_{1409} = p1 \times I_{1340} + p2 \times I_{1370} \quad \text{(Formula 1)}$$

$$\text{Crystallinity}[\%] = p1 \times (I_{1340}/I_{1409}) \times 100 \quad \text{(Formula 2)}$$

(in the formula, $I_{1409}$ indicates an absorbance at a wavenumber of 1,409 cm$^{-1}$, $I_{1370}$ indicates an absorbance at a wavenumber of 1,370 cm$^{-1}$, and $I_{1340}$ indicates an absorbance at a wavenumber of 1,340 cm$^{-1}$).

When the crystallinity of the first polyester film is 2% or more, the strength of the multilayer body is improved, and the puncture resistance and the like become excellent. In addition, when the crystallinity of the first polyester film is 15% or less, since the polyester film has sufficient fluidity when heated to a glass transition temperature or higher, the heat sealability of the sealant layer is improved, and filling suitability (particularly, high-speed filling suitability in continuous filling) and the like become excellent. In this regard, the crystallinity can be 2.5% or more, and may be 3% or more or 5% or more. In addition, the crystallinity can be 14% or less, and may be 13.5% or less or 13% or less. Here, since the first polyester film is a layer that contributes to heat sealability, it can be said to be a heat seal layer in the sealant layer.

In addition, when the multilayer body includes a second polyester film, the crystallinity of the second polyester film is 10% or more. When the crystallinity is 10% or more, the puncture resistance is improved and the pinhole resistance and the like become excellent. In this regard, the crystallinity may be 20% or more or 40% or more. On the other hand, the crystallinity of the second polyester film may be 70% or less. When the crystallinity is higher, the stiffness strength is also higher, but if the crystallinity is higher than 70%, the stiffness strength becomes too high, and when the multilayer body is used to produce a pouch, there is a risk of wrinkles occurring when sealing is performed after it is filled. In addition, the amount of content that can be filled into the pouch decreases. In this regard, the crystallinity may be 65% or less or 60% or less. Here, since the second polyester film is a layer that contributes to improving the strength of the sealant layer, it can be said to be a sealant base material layer in the sealant layer.

When the multilayer body includes the second polyester film, the crystallinity of the second polyester film may be higher than the crystallinity of the first polyester film. Thereby, it is easy to further improve the heat sealability and the puncture resistance.

The crystallinity of the polyester film can be adjusted by changing the type of monomers to be copolymerized. In addition, the degree of crystallization progress can be adjusted and the crystallinity can be adjusted by changing the cooling rate when a polyester film is formed. In addition, the crystallinity can also be adjusted by heating the formed polyester film. In addition, the crystallinity can be adjusted by changing film formation conditions such as a thermally fixing temperature and a stretching ratio. The polyester film can be obtained by, for example, condensation polymerization of diols and dicarboxylic acids. Examples of diols and dicarboxylic acids include the compounds exemplified for the base material layer.

In order for the packaging material to exhibit functions sufficiently, polybutylene terephthalate, polybutylene naphthalate, polyethylene terephthalate, or the like can be used as the polyester for the sealant layer.

The sealant layer may include a plurality of other polyester film layers in addition to the first polyester film and the second polyester film, and in this case, the other polyester films may be the same as or different from each other. When the sealant layer includes a plurality of other polyester film layers, at least the polyester film on the side of the innermost layer when used as a packaging bag may be a first polyester film having a crystallinity of 2 to 15%.

Various additives such as a flame retardant, a slipping agent, an anti-blocking agent, an antioxidant, a light stabilizer, and a tackifier may be added to the polyester film constituting the sealant layer.

In order to secure excellent strength and filling suitability, the thickness of the sealant layer can be 15 μm or more, and may be 15 to 100 μm or 20 to 60 μm. Here, when the thickness of the sealant layer is less than 15 μm, the seal strength tends to be insufficient depending on the size of the multilayer body and the amount of content. In addition, the mass ratio of the adhesive or ink in the multilayer body tends to be high. When the sealant layer includes a plurality of polyester film layers, the total thickness thereof may be within the above range.

The ratio of the thickness of the first polyester film to the thickness of the sealant layer may be 10 to 70%. When the ratio is 10% or more, it is easy to secure excellent seal strength, and when the ratio is 70% or less, it is easy to secure excellent puncture strength. In this regard, the ratio may be 20% or more or 30% or more, and may be 65% or less or 60% or less.

The glass transition temperature Tg of the first polyester film constituting the sealant layer can be 30 to 90° C., and may be 50 to 80° C. in order to exhibit favorable heat sealability. The glass transition temperature Tg can be determined by differential scanning calorimetry (DSC) measurement under conditions of a measurement temperature of 20 to 300° C. and a heating rate of 10° C./min.

When sealant layers are heat-sealed together under conditions of a temperature of Tg+60° C., an air pressure of 0.2 MPa, and a time of 1 second, the seal strength measured according to JIS K7127 may be 10 N/15 mm or more. When the seal strength is less than 10 N/15 mm, it may be difficult to maintain sufficient pressure resistance and impact resistance. In this regard, the seal strength may be 15 N/15 mm or more.

The sealant layer can have high hot tackiness. Specifically, the peeling distance in the hot tack test performed by the following method may be 150 mm or less. When the hot tackiness is insufficient, in applications in which the package is filled with its contents and sealed at a high speed, it may be difficult to maintain sufficient adhesive strength. In this regard, the peeling distance may be 120 mm or less, or 100 mm or less.

(Hot Tack Test)

Two multilayer bodies cut out to a width of 30 mm are laminated together so that the sealant layers are in contact with each other on the inside, and heat-sealing is performed under the following conditions. After the seal bar is released, T-type peeling is performed with a load (100 g each) of a weight attached to the end of the multilayer body, and the distance of the seal part that has peeled is measured.

Upper seal bar temperature: 120° C. or 180° C. (test is performed at both temperatures)
Lower seal bar temperature: 100° C.
Air pressure: 0.2 MPa
Seal time: 0.5 seconds
Seal bar: a width of 10 mm, a length of 300 mm The water vapor transmissivity of the multilayer body can be 10 g/m²·day or less. In addition, the oxygen transmissivity of the multilayer body can be 5 cc/m²·day or less. Thereby, the content is protected from deteriorating due to water vapor and oxygen, and it is easy to maintain the quality for a long time. In this regard, the water vapor transmissivity may be 7.5 g/m²·day or less or 5 g/m²·day or less. In addition, the oxygen transmissivity may be 4 cc/m²·day or less or 3 cc/m²·day or less. Here, when the multilayer body further includes a metal layer, the water vapor transmissivity and the oxygen transmissivity tend to be further reduced.

The multilayer body can have excellent strength. Specifically, the puncture strength measured according to JIS Z1707 may be 5 N or more. When the puncture strength is insufficient, the puncture resistance with respect to the outside or the content decreases, and there is a risk of a bag breaking. In this regard, the puncture strength may be 7.5 N or more or 10 N or more. Here, when the sealant layer includes essentially the second polyester film, the puncture strength tends to be further improved.

As described above, all the films constituting the multilayer body can be polyester films. Such a multilayer body can be said to be a packaging material composed of a single material (monomaterial) having excellent recyclability. In this regard, the total mass of the components (for example, the adhesive and the ink component) other than the polyester component with respect to the total mass of the multilayer body can be 10 mass % or less and may be 7.5 mass % or less or 5.0 mass % or less.

<Method for Selecting Polyester Film>

A method for selecting a polyester film is a method for selecting a polyester film that can be suitably used as a sealant layer in the multilayer body including a base material layer including a crystalline polyester film, an adhesive layer and a sealant layer in this order. The method for selecting a polyester film can also be said to be a method for selecting a polyester.

The method for selecting a polyester film includes performing FT-IR analysis on a polyester films according to a reflection method and the crystallinity of a polyester film is measured based on the following general formula as is disclosed in greater detail below and selecting a first polyester film having a crystallinity of 2 to 15% from among polyester films whose crystallinity has been measured.

$$I_{1409} = p1 \times I_{1340} + p2 \times 1_{1370} \tag{Formula 1}$$

$$\text{Crystallinity}[\%] = p1 \times (I_{1340}/I_{1409}) \times 100 \tag{Formula 2}$$

(in the formula, $I_{1409}$ indicates an absorbance at a wavenumber of 1,409 cm$^{-1}$, $I_{1370}$ indicates an absorbance at a wavenumber of 1,370 cm$^{-1}$, and $I_{1340}$ indicates an absorbance at a wavenumber of 1,340 cm$^{-1}$).

The FT-IR analysis performed on the polyester film by the reflection method can be performed, for example, as follows.

The seal surface of the first polyester film used as the sealant layer is brought into contact with a prism, and the absorbance is measured with a single reflection ATR measurement device. As the prism, ZnSe, Ge or the like can be used. The absorbance at each peak is calculated with a straight line connecting the absorbance at a wavenumber at which the peak with a wavenumber of 1,409 cm' begins to rise from the high wavenumber side in the absorption spectrum and the absorbance at a wavenumber at which the peak with a wavenumber of 1,340 cm$^{-1}$ begins to rise from the low wavenumber side as a base line (0 points).

When the first polyester film having a crystallinity of 2 to 15% selected by the selection method is used as a sealant layer, as described above, it is possible to obtain a multilayer body that can achieve both excellent filling suitability and strength of a packaging material.

The selection method may further include a step in which a second polyester film having a crystallinity of 10% or more is selected. In this case, in order to easily further improve the heat sealability and puncture resistance, the second polyester film may be selected so that the crystallinity of the second polyester film is higher than the crystallinity of the first polyester film.

When the film including the first polyester film having a crystallinity of 2 to 15% and the second polyester film having a crystallinity of 10% or more selected by the selection method is used as a sealant layer, it is possible to obtain a multilayer body that can achieve both excellent filling suitability and better strength of a packaging material.

<Method for Producing Multilayer Body>

The method for producing a multilayer body is a method for producing the multilayer body including a base material layer including a crystalline polyester film, an adhesive layer and a sealant layer in this order.

The method for producing a multilayer body includes a step in which a base material layer including a crystalline polyester film and a sealant layer are laminated with an adhesive layer therebetween. The lamination method is not particularly limited, and for example, a dry laminating method can be used. In this case, for the sealant layer, the first polyester film selected by the selection method is used and in some cases, additionally the second selected polyester film is used. As described above, the multilayer body obtained in this manner can achieve both the excellent filling suitability and strength of a packaging material.

When the multilayer body further includes a metal layer, it may be laminated on the base material layer by the dry laminating method in the same manner as above. Thereby, it is possible to obtain a multilayer body including the base material layer, the adhesive layer, the metal layer, the adhesive layer and the sealant layer.

When the sealant layer includes a plurality of polyester film layers, the sealant layer may be prepared by co-extruding polyesters together in advance and laminating them. Generally, in the case of layers (films) of the same type, the interlayer strength tends to be stronger when they are bonded by co-extrusion than when they are bonded by dry lamination. Co-extrusion is preferable because the interlayer strength affects the seal strength and pressure-resistance strength.

<Method for Producing Package>

A method for producing a package includes a step in which heat-sealing is performed when the sealant layers of the multilayer body produced by the production method are made to face each other and a package with the filled content is obtained. More specifically, this step can include a step of producing a packaging bag using a multilayer body, a step of filling the packaging bag with the content, and a step of sealing the packaging bag. In this case, for example, the packaging bag can be obtained by heat-sealing three sides of the multilayer body when the sealant layers of the multilayer body are made to face each other. Then, the content is filled from the remaining side that has not been heat-sealed, and finally, the remaining side can be heat-sealed to obtain a package. The filling method may be an intermittent filling method or a continuous filling method.

Since the crystallinity of the first polyester film constituting the sealant layer is 15% or less, the sealant layers can be fused together in the vicinity of the glass transition temperature thereof. Therefore, the heat seal temperature can be Tg+10 to 150° C. of the sealant layer, and may be Tg+40 to 100° C. Here, when sealing is necessary at a high temperature that is away from Tg, there is a possibility of a sufficient amount of heat not being provided and the seal strength being insufficient in applications in which the package is filled with its contents and sealed at a high speed, and there is a possibility of the margin between the temperature required for sealing and the temperature at which the film becomes brittle due to thermal deterioration being narrowed.

Examples of contents include liquid products such as liquid seasonings, toiletries, and liquid detergents, solid products such as nutritive supplements and powder detergents, and solid-liquid mixtures of liquid products such as baby food and pet food and solid products. Since the multilayer body has favorable heat sealability and high hot tackiness, even if the content is a liquid product or a solid-liquid mixture, it can be continuously filled, and the high-speed filling suitability is excellent.

In the production method, the volume proportion of air in the package at 23° C. after sealing can be 15 vol % or less. When the volume proportion of air exceeds 15 vol %, even if the barrier properties of the multilayer body itself are sufficient, there is a risk of the content deteriorating due to the residual oxygen in the package. In this regard, the volume proportion may be 12 vol % or less or 10 vol % or less. Examples of a method of filling the package with the content include an intermittent filling method and a continuous filling method. It can be said that the continuous filling method has a stricter filling environment than the intermittent filling method, but when the continuous filling method is used, the volume proportion can be easily kept within the above range.

EXAMPLES

While the present disclosure will be described in more detail with reference to the following examples, the present disclosure is not limited to these examples.

<Experiment 1>

[Production of Polyester Film]

Polyester Film A:

A resin for forming a polyester film was prepared using 85 mol % of terephthalic acid and 15 mol % of isophthalic acid as dicarboxylic acid components and 100 mol % of ethylene glycol as a diol component as starting materials. This resin was extruded by a casting method so that the thickness was 30 μm, and cooled by a cooling roller set to a surface temperature of 30° C. to obtain a polyester film A which is an unstretched polyester sealant film (heat seal PET: HSPET).

Polyester Film A':

A polyester film A' was obtained in the same manner as in the polyester film A except that the resin was extruded by the casting method so that the thickness was 12 μm.

Polyester Film B:

The polyester film A was passed through a roll to roll type drying furnace to obtain a polyester film B. In this case, the temperature of the drying furnace was set to 170° C., and the transport speed was adjusted so that the film was heated for 1 minute.

Polyester Film C:

A resin for forming a polyester film was prepared using 100 mol % of terephthalic acid as a dicarboxylic acid component, 60 mol % of ethylene glycol and 40 mol % of neopentyl glycol as diol components as starting materials. Using this resin, a polyester film C having a thickness of 30 μm was obtained in the same method as in the polyester film A.

Polyester Film D:

The polyester film A was passed through a roll to roll type drying furnace to obtain a polyester film D. In this case, the temperature of the drying furnace was set to 170° C., and the transport speed was adjusted so that the film was heated for 3 minutes.

Polyester Film E:

The polyester film A was passed through a roll to roll type drying furnace to obtain a polyester film E. In this case, the temperature of the drying furnace was set to 180° C., and the transport speed was adjusted so that the film was heated for 3 minutes.

Polyester Film F:

A Resin for Forming a Polyester Film was Prepared Using 100 Mol % of terephthalic acid as a dicarboxylic acid component, 50 mol % of ethylene glycol and 50 mol % of neopentyl glycol as diol components as starting materials. Using this resin, a polyester film F having a thickness of 30 μm was obtained in the same method as in the polyester film A.

Polyester Film G:

A resin for forming a polyester film was prepared using 100 mol % of terephthalic acid as a dicarboxylic acid component, 60 mol % of ethylene glycol 5 mol % of diethylene glycol and 35 mol % of 1,4-cyclohexane dimethanol as diol components, as starting materials. Using this resin, a polyester film G having a thickness of 30 μm was obtained in the same method as in the polyester film A.

(Measurement of Crystallinity of Polyester Film)

FT-IR analysis was performed on the polyester films by the reflection method, and the crystallinity of the polyester film of interest was measured by the following method. First, FT-IR analysis was performed on a commercially available A-PET film to determine a first absorbance at a wavenumber of 1,340 cm$^{-1}$ ($I1_{1340}$), a first absorbance at a wavenumber of 1,370 cm$^{-1}$ ($I1_{1370}$), and a first absorbance at a wavenumber of 1,409 cm$^{-1}$ ($I1_{1409}$). The determined first absorbances ($I1_{1340}$, $I1_{1370}$, and $I1_{1409}$) were assigned to:

$$I1_{1409} = p1 \times I1_{1340} + p2 \times I1_{1370} \quad \text{(Formula 1a)}.$$

FT-IR analysis was performed on a commercially available crystalline stretched PET film by the reflection method to determine a second absorbance at a wavenumber of 1.340 cm$^{-1}$ ($I2_{1340}$), a second absorbance at a wavenumber of 1,370 cm$^{-1}$ ($I2_{1370}$), and a second absorbance at a wavenumber of 1,409 cm$^{-1}$ ($I2_{1409}$). The determined second absorbances were assigned to:

$$I2_{1409} = p1 \times I2_{1340} + p2 \times I2_{1370} \quad \text{(Formula 1b)}.$$

Next, p1 and p2 were obtained by solving the simultaneous equations of Formula 1a and Formula 1b. Next, FT-IR analysis was performed on the produced polyester films (e.g., polyester films of interest) by the reflection method to determine an absorbance of the polyester film of interest at a wavenumber of 1,340 cm$^{-1}$ ($I3_{1340}$) and an absorbance of the polyester film of interest at a wavenumber of 1,409 cm$^{-1}$ ($I3_{1409}$). Then, based on the p1 obtained above and the determined absorbances of the polyester film of interest ($I3_{1340}$ and $I3_{1409}$), the crystallinity was calculated by:

$$\text{Crystallinity [\%]} = p1 \times (I3_{1340}/I3_{1409}) \times 100 \quad \text{(Formula 2)}.$$

Then, based on the crystallinity, the polyester films of interest A (A') to C and G were selected as polyester films corresponding to examples.

FT-IR analysis was performed on the polyester films by the reflection method as follows.

The seal surface of the polyester film used as the sealant layer was brought into contact with a prism, and the absorbance was measured with a single reflection ATR measurement device. Ge was used as the prism. The absorbance at each peak was calculated with a straight line connecting the absorbance at a wavenumber at which the peak with a wavenumber of 1,409 cm$^{-1}$ begun to rise from the high wavenumber side in the absorption spectrum and the absorbance at a wavenumber at which the peak with a wavenumber of 1,340 cm$^{-1}$ begun to rise from the low wavenumber side as a base line (0 points).

(Measurement of Glass Transition Temperature)

The glass transition temperature Tg of the polyester film was determined by differential scanning calorimetry (DSC) measurement under conditions of a measurement temperature of 20 to 300° C. and a heating rate of 10° C./min.

[Production of Multilayer Body]

Example 1

As a base film, a stretched PET film having a thickness of 12 μm, which is a crystalline polyester film, was prepared, and a silica vapor-deposition film as a barrier layer was provided on one surface thereof to form a barrier film. A silica vapor-deposited surface of the barrier film and the polyester film A were bonded by a dry laminating method to obtain a multilayer body. As the adhesive used for dry lamination, a general urethane resin-based adhesive was used. The amount of the dried urethane resin-based adhesive applied was adjusted to 3 g/m$^2$ (a thickness of 3 μm).

Example 2

A multilayer body was obtained in the same manner as in Example 1 except that the polyester film B was used in place of the polyester film A.

Example 3

A multilayer body was obtained in the same manner as in Example 1 except that the polyester film A' was used in place of the polyester film A.

Example 4

A multilayer body was obtained in the same manner as in Example 3 except that a stretched PET film having a thickness of 12 μm, which is a crystalline polyester film, was additionally laminated on the barrier film, and the amount of the dried urethane resin-based adhesive applied was adjusted to 4 g/m$^2$ (a thickness of 4 μm). The urethane resin-based adhesive was also used in lamination of the stretched PET film.

Example 5

A multilayer body was obtained in the same manner as in Example 1 except that a PET film (the base film was a crystalline polyester film) coated with polyvinylidene chloride (PVDC) was used in place of the barrier film.

Example 6

A multilayer body was obtained in the same manner as in Example 1.

Example 7

A multilayer body was obtained in the same manner as in Example 2.

Example 8

A multilayer body was obtained in the same manner as in Example 1 except that the polyester film C was used in place of the polyester film A.

Example 9

A multilayer body was obtained in the same manner as in Example 1 except that the polyester film G was used in place of the polyester film A.

Comparative Example 1

A multilayer body was obtained in the same manner as in Example 1 except that the polyester film D was used in place of the polyester film A.

Comparative Example 2

A multilayer body was obtained in the same manner as in Comparative Example 1.

Comparative Example 3

A multilayer body was obtained in the same manner as in Example 1 except that the polyester film E was used in place of the polyester film A.

Comparative Example 4

A multilayer body was obtained in the same manner as in Comparative Example 3.

Comparative Example 5

A multilayer body was obtained in the same manner as in Example 1 except that the polyester film F was used in place of the polyester film A.

[Various Evaluations]

Various evaluations were performed on the obtained multilayer bodies. The results are shown in Table 1 and Table 2.

(Measurement of Seal Strength)

The sealant layers of the multilayer body were heat-sealed together under conditions of a temperature Tg+60° C., an air pressure of 0.2 MPa, and a time of 1 second (here, Tg is a glass transition temperature measured by the above DSC). Then, the seal strength between the sealant layers was measured according to JIS K7127.

(Hot Tack Test)

Two multilayer bodies cut out to a width of 30 mm were laminated together so that the sealant layers were in contact with each other on the inside, and heat-sealing was performed under the following conditions. After the seal bar was released, T-type peeling was performed with a load (100 g each) of a weight attached to the end of the multilayer body, and the distance of the seal part that had peeled was measured.

Upper seal bar temperature: 120° C. or 180° C. (test was performed at both temperatures)

Lower seal bar temperature: 100° C.

Air pressure: 0.2 MPa

Seal time: 0.5 seconds

Seal bar: a width of 10 mm, a length of 300 mm (Puncture Strength Test)

The puncture strength of the multilayer body was measured according to JIS Z1707. The surface on which puncture started was the side of the base film.

(Measurement of Oxygen Transmissivity and Water Vapor Transmissivity)

The oxygen transmissivity and the water vapor transmissivity of the multilayer body were measured according to JIS K7126B.

(Evaluation of Filling Suitability)

The filling suitability test of the multilayer body in the intermittent filling method or the continuous filling method was performed under the following conditions.

Device used: Dangan type III commercially available from Taisei Lamick Co., Ltd.

Film width: 80 mm

Feed direction seal pitch: 90 mm

Content: 5 g of soy source

Filling method: intermittent (alternate operation of filling and sealing) 50 shots/minute, a gas volume proportion of 12%:continuous (seal in liquid) 200 shots/minute, a gas volume proportion of 8%

Seal conditions: a temperature of Tg+90° C., a pressure of 0.2 MPa

The test results were evaluated based on the following criteria.

Determination Criteria (Pressure Resistance):

Evaluation A There was no bag breakage in a static load test of 100 kg×1 minute

Evaluation B There was a bag breakage in a static load test of 100 kg×1 minute, and no bag breakage at 80 kg×1 minute Evaluation C There was a bag breakage in a static load test of 80 kg×1 minute Determination Criteria (Flavor Deterioration):

The packaging bag filled with the soy source prepared as described above was stored in a 40° C. 90% RH environment for 1 week. 10 subjects were asked to determine whether taste and flavor had changed (deteriorated) after storage.

Evaluation A Two or fewer subjects perceived deterioration

Evaluation B Three or more subjects perceived deterioration (Mass Ratio of Polyester Component)

The mass ratio of the polyester component was calculated based on the total mass of the materials constituting the multilayer body.

TABLE 1

|  |  | Example 1 | Example 2 | Example 3 | Example 4 | Example 5 |
|---|---|---|---|---|---|---|
| Type of polyester film |  | A | B | A' | A' | A |
| Crystallinity of polyester film |  | 10% | 15% | 10% | 10% | 10% |
| Tg of polyester film |  | 75° C. | 76° C. | 75° C. | 75° C. | 75° C. |
| Filling method |  | Continuous | Continuous | Continuous | Continuous | Continuous |
| Gas volume proportion |  | 8 vol % | 8 vol % | 8 vol % | 8 vol % | 8 vol % |
| Seal temperature | ° C. | 135 | 136 | 135 | 135 | 135 |
| Seal strength | N/15 mm | 25 | 20 | 13 | 12 | 24 |
| Hot tack at 120° C. | mm | 100 | 150 | 95 | 90 | 100 |
| Hot tack at 180° C. | mm | 80 | 120 | 90 | 90 | 80 |
| Puncture strength | N | 15 | 21 | 6 | 16 | 15 |
| Oxygen transmissivity | cc/m$^2$ · day | 0.2 | 0.2 | 0.2 | 0.2 | 80 |
| Water vapor transmissivity | g/m$^2$ · day | 0.5 | 0.5 | 0.5 | 0.5 | 15 |
| Filling suitability Pressure resistance | — | A | B | B | A | A |
| Flavor deterioration | — | A | A | A | A | B |
| Polyester mass ratio | — | 95% | 95% | 92% | 86% | 92% |

|  |  | Example 6 | Example 7 | Example 8 | Example 9 |
|---|---|---|---|---|---|
| Type of polyester film |  | A | B | C | G |
| Crystallinity of polyester film |  | 10% | 15% | 2.5% | 10% |
| Tg of polyester film |  | 75° C. | 76° C. | 73° C. | 75° C. |
| Filling method |  | Intermittent | Intermittent | Continuous | Continuous |
| Gas volume proportion |  | 12 vol % | 12 vol % | 8 vol % | 8 vol % |
| Seal temperature | ° C. | 135 | 136 | 133 | 135 |
| Seal strength | N/15 mm | 25 | 20 | 28 | 30 |
| Hot tack at 120° C. | mm | 100 | 150 | 60 | 95 |
| Hot tack at 180° C. | mm | 80 | 120 | 40 | 75 |
| Puncture strength | N | 15 | 21 | 5 | 15 |
| Oxygen transmissivity | cc/m$^2$ · day | 0.2 | 0.2 | 0.2 | 0.2 |
| Water vapor transmissivity | g/m$^2$ · day | 0.5 | 0.5 | 0.5 | 0.5 |
| Filling suitability Pressure resistance | — | A | A | A | A |
| Flavor deterioration | — | B | B | A | A |
| Polyester mass ratio | — | 95% | 95% | 95% | 95% |

TABLE 2

|  |  | Comparative Example 1 | Comparative Example 2 | Comparative Example 3 | Comparative Example 4 | Comparative Example 5 |
|---|---|---|---|---|---|---|
| Type of polyester film |  | D | D | E | E | F |
| Crystallinity of polyester film |  | 20% | 20% | 25% | 25% | 1.5% |
| Tg of polyester film |  | 78° C. | 78° C. | 78° C. | 78° C. | 73° C. |
| Filling method |  | Continuous | Intermittent | Continuous | Intermittent | Continuous |
| Gas volume proportion |  | 8 vol % | 12 vol % | 8 vol % | 12 vol % | 8 vol % |
| Seal temperature | ° C. | 138 | 138 | 138 | 138 | 133 |
| Seal strength | N/15 mm | 12 | 12 | 7 | 7 | 28 |
| Hot tack at 120° C. | mm | 200 | 200 | 300< | 300< | 60 |
| Hot tack at 180° C. | mm | 150 | 150 | 300< | 300< | 40 |
| Puncture strength | N | 27 | 27 | 33 | 33 | 3 |
| Oxygen transmissivity | cc/m$^2$ · day | 0.2 | 0.2 | 0.2 | 0.2 | 0.2 |
| Water vapor transmissivity | g/m$^2$ · day | 0.5 | 0.5 | 0.5 | 0.5 | 0.5 |
| Filling suitability Pressure resistance | — | C | B | C | C | A |
| Flavor deterioration | — | A | B | A | B | A |
| Polyester mass ratio | — | 95% | 95% | 95% | 95% | 95% |

<Experiment 2>
[Production of Sealant Film]

Resins for forming a polyester film using monomers shown in Table 3 as starting materials were prepared. In the table, TPA is terephthalic acid, EG is ethylene glycol, NPG is neopentylglycol, BDO is 1,4-butanediol, DEG is diethylene glycol, CHDM is 1,4-cyclohexane dimethanol, and the unit of the numerical value is mol %.

TABLE 3

| Carboxylic acid component | Diol component | | | | |
|---|---|---|---|---|---|
| TPA | EG | NPG | BDO | DEG | CHDM |
| Resin 1  100 | 52 | — | — | 6 | 42 |
| Resin 2  100 | 57 | — | — | 5 | 38 |
| Resin 3  100 | 60 | — | — | 5 | 35 |
| Resin 4  100 | 80 | — | — | 5 | 15 |
| Resin 5  100 | 87 | — | — | 3 | 10 |
| Resin 6  100 | 70 | 19 | 9 | 2 | — |
| Resin 7  100 | 80 | 10 | 8 | 2 | — |

Sealant Film A:

A resin 3 and a resin 7 were co-extruded by a casting method and then stretched at a stretching ratio of 3 in the film transport direction (hereinafter referred to as "MD") to obtain a 2-layer sealant film A. The heat seal layer was a layer in which the resin 3 was extruded. The thickness of each layer after stretching was 15 µm.

Sealant Film B:

A sealant film B was obtained in the same manner as in the sealant film A except that the resin 6 was used in place of the resin 7. The heat seal layer was a layer in which the resin 3 was extruded.

Sealant Film C:

A sealant film C was obtained in the same manner as in the sealant film A except that the resin 1 was used in place of the resin 7. The heat seal layer was a layer in which the resin 1 was extruded.

Sealant Film D:

A sealant film D was obtained in the same manner as in the sealant film A except that the resin 4 was used in place of the resin 3. The heat seal layer was a layer in which the resin 4 was extruded.

Sealant Film E:

A sealant film E was obtained in the same manner as in the sealant film A except that the thickness of the layer made of the resin 3 was changed to 5 µm, and the thickness of the layer made of the resin 7 was changed to 10 µm.

Sealant Film F:

A sealant film F was obtained in the same manner as in the sealant film A except that the thickness of the layer made of the resin 3 was changed to 3 µm, and the thickness of the layer made of the resin 7 was changed to 27 µm.

Sealant Film G:

A sealant film G was obtained in the same manner as in the sealant film A except that the thickness of the layer made of the resin 3 was changed to 21 µm, and the thickness of the layer made of the resin 7 was changed to 9 µm.

Sealant Film H:

A sealant film H was obtained in the same manner as in the sealant film A except that the resin 1 and the resin 2 were used in place of the resin 3 and the resin 7, respectively. The heat seal layer was a layer in which the resin 1 was extruded.

Sealant Film I:

A Sealant Film I was Obtained in the Same Manner as in the Sealant film A except that the resin 5 was used in place of the resin 3. The heat seal layer was a layer in which the resin 5 was extruded.

Sealant film J:

A resin 5 was extruded by a casting method and then stretched at a stretching ratio of 3 in the MD to obtain a single-layer sealant film J The thickness after stretching was 30 µm.

(Measurement of Crystallinity of Polyester Film)

In the same manner as in Experiment 1, the crystallinity of the polyester film constituting the sealant film was measured. For the polyester film used as the sealant base material layer, the surface in contact with the adhesive layer was brought into contact with a prism, and the absorbance was measured. Then, based on the crystallinity, the sealant films A to H were selected as sealant films corresponding to examples.

[Production of Multilayer Body]

Example 10

As a base film, a stretched PET film having a thickness of 12 µm, which is a crystalline polyester film, was prepared, and a silica vapor-deposition film as a barrier layer was provided on one surface thereof to form a barrier film. A silica vapor-deposited surface of the barrier film and the sealant film A were bonded by a dry laminating method to obtain a multilayer body. As the adhesive used for dry lamination, a general urethane resin-based adhesive was used. The amount of the dried urethane resin-based adhesive applied was adjusted to 3 g/m$^2$ (a thickness of 3 µm).

Example 11

A multilayer body was obtained in the same manner as in Example 10 except that the sealant film B was used in place of the sealant film A.

Example 12

A multilayer body was obtained in the same manner as in Example 10 except that the sealant film C was used in place of the sealant film A.

Example 13

A multilayer body was obtained in the same manner as in Example 10 except that the sealant film D was used in place of the sealant film A.

Example 14

A multilayer body was obtained in the same manner as in Example 10 except that the sealant film E was used in place of the sealant film A.

Example 15

A multilayer body was obtained in the same manner as in Example 10 except that the sealant film F was used in place of the sealant film A.

Example 16

A multilayer body was obtained in the same manner as in Example 10 except that the sealant film G was used in place of the sealant film A.

Example 17

As a base film, a stretched PET film having a thickness of 12 µm, which is a crystalline polyester film, an aluminum foil having a thickness of 9 µm and a sealant film A were prepared, and these were bonded by a dry laminating method to obtain a multilayer body. As the adhesive used for dry lamination, a general urethane resin-based adhesive was used. The amount of the dried urethane resin-based adhesive applied was adjusted to 3 g/m$^2$ (a thickness of 3 µm).

Example 18

A multilayer body was obtained in the same manner as in Example 10 except that the sealant film H was used in place of the sealant film A.

Comparative Example 6

A multilayer body was obtained in the same manner as in Example 10 except that the sealant film I was used in place of the sealant film A.

Comparative Example 7

A multilayer body was obtained in the same manner as in Example 10 except that the sealant film J was used in place of the sealant film A.

[Various Evaluations]
Various evaluations were performed on the obtained multilayer bodies. The results are shown in Table 4 and Table 5.
(Measurement of Oxygen Transmissivity and Water Vapor Transmissivity)
The oxygen transmissivity and the water vapor transmissivity of the multilayer body were measured according to JIS K7126B.
(Measurement of Puncture Strength)
The puncture strength of the multilayer body was measured according to JIS Z1707. The surface on which puncture started was the side of the base film.
(Bending Pinhole Test)
A Gelbo Flex Tester was used to bend the multilayer body at 25° C. 500 times and 1,000 times and the number of pinholes was then checked.
Determination criteria:
Evaluation A There were no pinholes after bending 1,000 times
Evaluation B There were no pinholes after bending 500 times
Evaluation C There were pinholes after bending 500 times
(Measurement of Seal Strength and Pressure Resistance Test)
A package was produced under the following conditions, and the seal strength was measured and the pressure resistance test was performed. The seal strength was measured according to JIS K7127.

Device used: Dangan type III commercially available from Taisei Lamick Co., Ltd.

Filling method: continuous filling

Film width: 80 mm

Feed direction seal pitch: 140 mm

Content: 30 ml of water

Filling rate: 200 shots/minute

Seal conditions: 160° C., a pressure of 0.2 MPa

Pressure Resistance Test Determination Criteria:

Evaluation A Dynamic load test of 300 kgf or more

Evaluation B There was no bag breakage in a dynamic load test of less than 300 kgf, and a static load test of 100 kg×1 minute Evaluation C There was a bag breakage in a static load test of 100 kg×1 minute The static load test was performed according to JIS Z0238. In addition, in the dynamic load test, the package was compressed at a test speed of 10 mm/min and the maximum load when the package broke was recorded.

(Mass Ratio of Polyester Component)
The mass ratio of the polyester component was calculated based on the total mass of the materials constituting the multilayer body.

TABLE 4

|  |  | Example 10 | Example 11 | Example 12 | Example 13 |
|---|---|---|---|---|---|
| Base material layer |  | Silica vapor-deposition PET | Silica vapor-deposition PET | Silica vapor-deposition PET | Silica vapor-deposition PET |
| Metal layer |  | — | — | — | — |
| Type of sealant film |  | A | B | C | D |
| Sealant material layer (crystallinity/thickness) |  | 60%/15 μm | 40%/15 μm | 10%/15 μm | 60%/15 μm |
| Heat seal layer (crystallinity /thickness) |  | 10%/15 μm | 10%/15 μm | 4%/15 μm | 15%/15 μm |
| Oxygen transmissivity | cc/m² · day | 0.2 | 0.2 | 0.2 | 0.2 |
| Water vapor transmissivity | g/m² · day | 0.5 | 0.5 | 0.5 | 0.5 |
| Puncture strength | N | 18 | 17 | 12 | 24 |
| Bending pinhole test | — | A | A | B | A |
| Seal strength | N/15 mm | 20 | 20 | 25 | 17 |
| Pressure resistance test | — | A | A | A | B |
| Polyester mass ratio | — | 95% | 95% | 95% | 95% |

|  |  | Example 14 | Example 15 | Example 16 | Example 17 |
|---|---|---|---|---|---|
| Base material layer |  | Silica vapor-deposition PET | Silica vapor-deposition PET | Silica vapor-deposition PET | PET |
| Metal layer |  | — | — | — | AL |
| Type of sealant film |  | E | F | G | A |
| Sealant material layer (crystallinity/thickness) |  | 60%/10 μm | 60%/27 μm | 60%/9 μm | 60%/15 μm |
| Heat seal layer (crystallinity /thickness) |  | 10%/5 μm | 10%/3 μm | 10%/21 μm | 10%/15 μm |
| Oxygen transmissivity | cc/m² · day | 0.2 | 0.2 | 0.2 | 0.05> |
| Water vapor transmissivity | g/m² · day | 0.5 | 0.5 | 0.5 | 0.01> |
| Puncture strength | N | 10 | 27 | 16 | 19 |
| Bending pinhole test | — | B | A | B | A |
| Seal strength | N/15 mm | 15 | 13 | 28 | 20 |
| Pressure resistance test | — | B | B | A | A |
| Polyester mass ratio | — | 93% | 95% | 95% | 66% |

TABLE 5

|  | Example 18 | Comparative Example 6 | Comparative Example 7 |
|---|---|---|---|
| Base material layer | Silica vapor-deposition PET | Silica vapor-deposition PET | Silica vapor-deposition PET |
| Metal layer | — | — | — |

TABLE 5-continued

|  |  | Example 18 | Comparative Example 6 | Comparative Example 7 |
|---|---|---|---|---|
| Type of sealant film |  | H | I | J |
| Sealant material layer (crystallinity/thickness) |  | 8%/15 μm | 60%/15 μm | 20%/30 μm |
| Heat seal layer (crystallinity/thickness) |  | 4%/15 μm | 20%/15 μm |  |
| Oxygen transmissivity | cc/m² · day | 0.2 | 0.2 | 0.2 |
| Water vapor transmissivity | g/m² · day | 0.5 | 0.5 | 0.5 |
| Puncture strength | N | 10 | 23 | 21 |
| Bending pinhole test | — | B | A | A |
| Seal strength | N/15 mm | 25 | 1> | 1> |
| Pressure resistance test | — | A | C | C |
| Polyester mass ratio | — | 95% | 95% | 95% |

The multilayer body according to the present disclosure can achieve both excellent filling suitability and strength of a packaging material, and substantially all constituent films thereof can be polyester films. Such a multilayer body can be said to be a packaging material composed of a single material (monomaterial), and excellent recyclability is expected.

REFERENCE SIGNS LIST

1 Base material layer
2 Adhesive layer
3 Sealant layer
3a Sealant base material layer
3b Heat seal layer
10, 20 Multilayer body

The invention claimed is:
1. A method comprising:
a first step including:
determining, by performing FT-IR analysis by a reflection method on an amorphous polyethylene terephthalate film, a first absorbance at a wavenumber of 1,340 cm$^{-1}$ ($I1_{1340}$), a first absorbance at a wavenumber of 1,370 cm$^{-1}$ ($I1_{1370}$), and a first absorbance at a wavenumber of 1,409 cm$^{-1}$ ($I1_{1409}$) and assigning $I1_{1340}$, $I1_{1370}$, and $I1_{1409}$ to:

$$I1_{1409} = p1 \times I1_{1340} + p2 \times I1_{1370} \quad \text{(Formula 1a)};$$

determining, by performing FT-IR analysis by the reflection method on a crystalline polyethylene terephthalate film that has a different crystallinity than the amorphous polyethylene terephthalate film, a second absorbance at a wavenumber of 1,340 cm$^{-1}$ ($I2_{1340}$), a second absorbance at a wavenumber of 1,370 cm$^{-1}$ ($I2_{1370}$), and a second absorbance at a wavenumber of 1,409 cm$^{-1}$ ($I2_{1409}$) and assigning $I2_{1340}$, $I2_{1370}$, and $I2_{1409}$ to:

$$I2_{1409} = p1 \times I2_{1340} + p2 \times I2_{1370} \quad \text{(Formula 1b)};$$

a second step including:
obtaining simultaneous equations of p1 and p2 from the Formula 1a and the Formula 1b and solving the simultaneous equations for p1 and p2;
a third step including:
determining, by performing FT-IR analysis by the reflection on a polyethylene terephthalate film of interest, a third absorbance of the polyethylene terephthalate film of interest at a wavenumber of 1,340 cm$^{-1}$ ($I3_{1340}$) and a third absorbance of the polyethylene terephthalate film of interest at a wavenumber of 1,409 cm$^{-1}$ ($I3_{1409}$);

measuring a crystallinity of the polyester polyethylene terephthalate film of interest by:

$$\text{Crystallinity } [\%] = p1 \times (I3_{1340}/I3_{1409}) \times 100 \quad \text{(Formula 2)}$$

wherein, p1 is the obtained p1 from the second step; and
a fourth step including:
selecting the polyester polyethylene terephthalate film of interest as a first polyethylene terephthalate film of a sealant layer of a multilayer body when the measured crystallinity of the polyethylene terephthalate film of interest is from 2 to 15%, resulting in the multilayer body including a base material layer including crystalline polyester film, an adhesive layer, and the sealant layer in this order.

2. The method of claim 1, further comprising selecting as a second polyethylene terephthalate film of a sealant base layer, the polyethylene terephthalate film of interest when the measured crystallinity of the polyethylene terephthalate film of interest is 10% or more, resulting in the multilayer body including the base material layer including crystalline polyester film, the adhesive layer, the sealant base layer, and the sealant layer in this order.

3. The method of claim 2, further comprising
laminating together the base material layer and the sealant layer with the adhesive layer and the sealant base layer therebetween to form the multilayer body,
wherein the sealant layer includes the first polyethylene terephthalate film and the sealant base layer includes the second polyethylene terephthalate film.

4. The method of claim 1, further comprising:
laminating together the base material layer and the sealant layer with the adhesive layer therebetween to form the multilayer body,
wherein the sealant layer is the first polyethylene terephthalate film.

5. The method of claim 4,
wherein a thickness of the sealant layer is 15 μm or more.

6. The method of claim 4,
wherein the crystalline polyester film includes an inorganic oxide vapor deposition layer on at least one surface.

7. The method of claim 4,
wherein the multilayer body has a water vapor transmissivity of 10 g/m²·day or less.

8. The method of claim 4,
wherein the multilayer body has an oxygen transmissivity of 5 cc/m²·day or less.

9. The method of claim 4, wherein the multilayer body includes a first multilayer body having the sealant layer and a second multilayer body having the sealant layer, so that when the sealant layer of the first multilayer body and the sealant layer of the second sealant layer face each other the sealant layer of the first multilayer body and the sealant layer of the second multilayer body are heat sealable together to form a package filled with content.

10. The method of claim 9,
wherein the package has a volume proportion of air at 23° C. of 15 vol % or less.

* * * * *

UNITED STATES PATENT AND TRADEMARK OFFICE
CERTIFICATE OF CORRECTION

PATENT NO. : 12,306,096 B2
APPLICATION NO. : 17/614123
DATED : May 20, 2025
INVENTOR(S) : Haruna Kadoya et al.

Page 1 of 1

It is certified that error appears in the above-identified patent and that said Letters Patent is hereby corrected as shown below:

In the Claims

Column 22, Line 21:
In Claim 1, delete "the polyester" and insert -- the --.

Signed and Sealed this
Fifteenth Day of July, 2025

Coke Morgan Stewart
*Acting Director of the United States Patent and Trademark Office*